United States Patent [19]
Pollock

[11] 3,914,721
[45] Oct. 21, 1975

[54] COMBINATION SPECULAR-DIFFUSE PROJECTION DEVICE AND METHOD

[75] Inventor: John S. Pollock, Rochester, N.Y.

[73] Assignee: Eastman Kodak Company, Rochester, N.Y.

[22] Filed: Sept. 3, 1970

[21] Appl. No.: 69,386

[52] U.S. Cl. .................. 355/35; 355/37; 355/71; 355/88
[51] Int. Cl.[2] .................................. G03B 27/76
[58] Field of Search ............ 355/35, 36, 37, 71, 88

[56] References Cited
UNITED STATES PATENTS

| | | | |
|---|---|---|---|
| 2,220,207 | 11/1940 | Busse | 355/71 X |
| 2,500,049 | 3/1950 | Williams | 355/37 X |
| 2,518,947 | 8/1950 | Simmon | 355/35 |
| 2,544,196 | 3/1951 | Varden | 355/88 X |
| 3,002,425 | 10/1961 | Biedermann | 355/36 |

FOREIGN PATENTS OR APPLICATIONS

| | | | |
|---|---|---|---|
| 409,287 | 4/1934 | United Kingdom | 355/37 |
| 1,079,511 | 8/1967 | United Kingdom | 355/37 |

Primary Examiner—Monroe H. Hayes
Attorney, Agent, or Firm—W. F. Noval

[57] ABSTRACT

A method and device are provided for exposing a photosensitive surface to specular illumination of a color to which it is speed limited, such as blue, and to diffuse illumination of other colors, such as red and green to suppress defects such as scratches in an original from which a print is to be made. A device for accomplishing this result can comprise a pair of spaced rotatable discs mounted on a common shaft. One of the discs has three color separation filters spaced therearound and the other disc has three spaced openings aligned with the color separation filters, one opening being left uncovered to provide specular illumination of the image projected through the color filter aligned therewith and the other two openings being covered by diffusers for causing projection of diffuse images through the color filters aligned respectively with these openings.

6 Claims, 2 Drawing Figures

JOHN S. POLLOCK
INVENTOR.
BY Gary D. Fields
Robert W. Hampton
ATTORNEYS

COMBINATION SPECULAR-DIFFUSE PROJECTION DEVICE AND METHOD

BACKGROUND OF THE INVENTION

1. Field of the Invention

This invention relates to a projection device and method more particularly to a projection device and method for projecting both specular and diffuse color separation images onto a photosensitive material which is speed limited in the range of the electromagnetic spectrum corresponding to the specular illumination.

2. Description of the Prior Art

It is well known that if an original to be copied contains defects, such as scratches and dust, these scratches may be suppressed to a great degree in a resulting print by use of diffuse lighting which decreases to a large extent the contrast of the defects so that they are less noticeable. However, since the light is scattered more it is necessary to use a much brighter light source or to extend the exposure time for an increased period of time to obtain sufficient exposure of the photosensitive material in order to make a print of sufficiently high contrast. Some photosensitive materials are speed limited with respect to portions of the electromagnetic spectrum, i.e., they are less sensitive to such radiation and require a greater length of exposure to such radiation to obtain an image of sufficiently high contrast. Sometimes this length of time is orders of magnitude greater than the exposure time required for exposure to other portions of the electromagnetic spectrum. The phenomenon of blue-speed limitations is common in systems employing color negative material such as Kodacolor film whose yellow-orange masking layer has a high blue density. Also, some photosensitive materials such as certain organic photoconductors have a blue sensitivity of only one-fifth to one-tenth that of the red portion of the electromagnetic spectrum. Also, a common source of illumination is tungsten illumination which is relatively low in blue content. The combination of two or more of these factors, that is, the photosensitive material with a blue-speed limitation and the use of an illumination source which contains little blue light, such as a tungsten source, can result in a system which requires blue exposure time to be 10 to 100 or more times the length of the green and red exposure times if compensatory measures are not taken.

Thus, to make color separation images it may be necessary to extend the exposure time for a blue color separation image. Furthermore, it is desirable to suppress defects, such as scratches in the original. To do this, diffuse illumination is required but this increases the length of blue exposure time to a length of time which is impractical for many applications.

SUMMARY OF THE INVENTION

In accordance with the present invention a method of suppressing defects in a composite print made by projecting at least first and second color separation images onto a photosensitive surface which is less responsive to exposure to the first image than to the second image is accomplished by projecting the first image by means of relatively specular illumination and projecting the second image by means of relatively diffuse illumination. This method may be accomplished by a device which includes a movable means for supporting at least first and second color separation filters, a movable diffuser means mounted in optical alignment with the second color separation filter and means for moving the filter support means and the diffuser means to bring sequentially the first color separation filter into the projection axis to project a relatively specular first color separation image onto the photosensitive surface and to bring the second color separation filter and the diffuser means into the projection axis to project a relatively diffuse second color separation image onto the photosensitive surface.

More particularly, exposure time of comparable magnitude can be maintained in the red, green and blue ranges of the electromagnetic spectrum while maintaining a high degree of defect or scratch suppression by exposing a photosensitive material which is blue-speed limited to red and green color separation images by diffuse illumination to suppress defects and by exposing the photosensitive material to specular blue illumination to decrease the required exposure time to blue light. A high degree of scratch suppression is obtained because in making the print the complementary colors are used and the eye is less sensitive to scratches in yellow than in either cyan or magenta. For purposes of this invention, the order of these exposures is immaterial and can occur in whatever order is desired. This method can be accomplished by using a pair of spaced rotatable discs, the first disc having spaced red, green and blue separation filters and the second rotatable disc having first, second and third openings aligned with the blue, red, and green separation filters, respectively, and having a diffuser in the second and third openings only. The discs are mounted on a central shaft for rotation to bring the color separation filters sequentially into alignment with a projection axis for projecting a relatively specular blue color separation image and relatively diffuse red and green color separation images.

It will be understood that the terms "specular" and "diffuse" are relative terms and that the blue light may be diffused by a weak diffuser, but the amount of diffusion will be significantly less than that caused by the diffusers for red or green so that with respect to the red and green illumination, the blue illumination can be considered "specular".

Additional novel features of this invention will become apparent from the description which follows, taken in conjunction with the accompanying drawings.

DESCRIPTION OF THE PREFERRED EMBODIMENT

Figure 1:
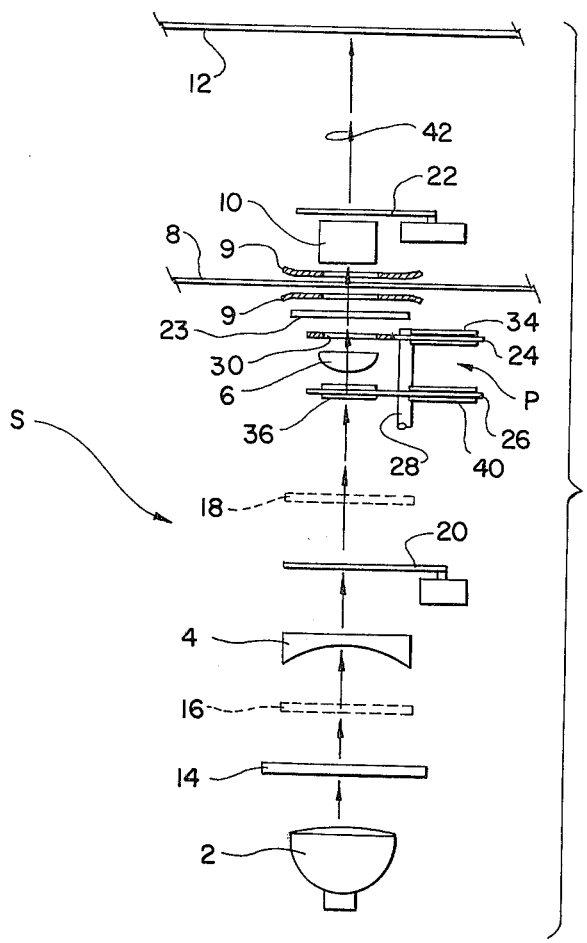
FIG. 1 is a diagrammatic side elevation of an illumination system including a projection device constructed in accordance with this invention.
Figure 2:
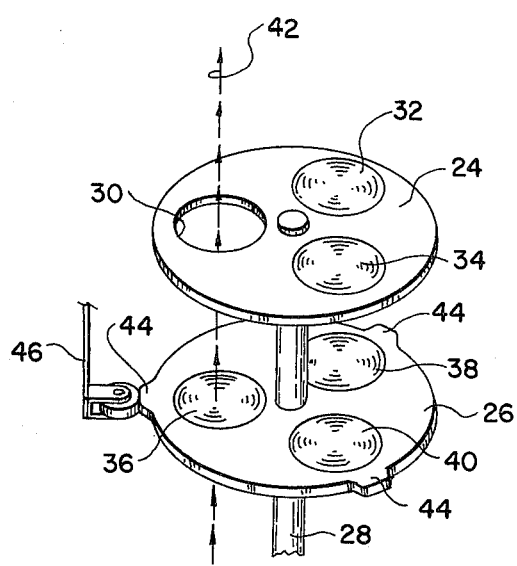
FIG. 2 is a perspective view of the projection device of FIG. 1.

In accordance with this invention, an illumination system S is shown in FIG. 1 which includes an illumination source 2 whose light is directed by a negative lens 4 and a condenser lens 6 through an original, such as film strip 8 supported between spaced guides 9 to project an image by means of projection lens 10 onto a photosensitive material 12. Of course, it will be understood that different combinations of lenses can be provided for a particular application in place of the combination shown. In addition, other elements can be placed in the projection system if desired or required, such as heat absorber 14, shown positioned between light source 2 and negative lens 4. In addition, weak diffusers 16 and 18 might be desired to provide more uniform illumination. In addition, the system includes a shutter 20 which is illustrated as being positioned between negative lens 4 and condenser lens 6. This shutter prevents overheating of the film strip and the filters if the projection lamp remains on. A second shutter 22 is provided between the projection lens 10 and photosensitive material 12 to control exposure time. Color correction filters, such as filter 23 can be interposed in the projection device, if needed. The projection device P for providing specular illumination of a blue color separation image and diffuse illumination of red and green color separation images includes, as best seen in FIG. 2, a diffuser means comprising a diffuser disc 24 and a filter disc 26 mounted for rotation on a common shaft 28. Conveniently, diffuser disc 24 includes three spaced openings therearound, the first opening 30 being open and the other openings being covered by diffusers 32 and 34, respectively.

Advantageously, filter disc 26 includes three spaced color separation filters, such as blue color separation filter 36, red color separation filter 38 and green color separation filter 40, as shown. These filters are respectively aligned with opening 30, diffuser 32 and diffuser 34 so that upon rotation of the disc 24 and 26 by shaft 28 the respective filters can be brought into alignment with projection axis 42 to provide specular illumination of a blue color separation image and diffuse illumination of the red and green color separation images so that the blue exposure time is compatible with the red and green exposure time, yet substantial scratch suppression is obtained by use of a diffuse red and green illumination. Since the eye is not very sensitive to scratches or other defects in the yellow image printed from the blue exposure, the specular illumination of this image does not affect the resulting composite color print significantly.

Conveniently, filter disc 26 may be provided with a cam surface 44 associated with each filter for operating a switch 46 as each filter is brought into alignment with projection axis 42 to stop the drive means (not shown) to shaft 28 and to initiate the exposure. Upon termination of the proper exposure period means (not shown) may be provided to energize the drive means to cause shaft 28 to begin rotating again to bring the next filter into alignment with projection axis 42.

Of course, various modifications to the structure shown can be utilized. For example, if diffusers 32 and 34 are identical they may be incorporated in a flag which is pivoted into and out of alignment with projection axis 42 so as to be in the projection axis during projection through filters 38 and 40 but out of alignment with the projection axis during projection through filter 36. Alternatively, disc 24 could itself be a diffuser having an opening which is in alignment with filter 36 for specular illumination. Also, in the embodiment illustrated, opening 30 could be provided with a diffuser which is weaker than diffusers 32 and 34.

An experimental test using a Kodacolor-X negative as an original illuminated by a 750 watt Xenon lamp resulted in the test results tabulated below. The photosensitive surface was a blue-speed limited organic photoconductor of the type disclosed in British Pat. No. 1,153,506. A 4 millimeter P2043 was used in the projection system for each exposure. In addition, the red diffuse image was projected with a W29 filter and the green diffuse image was projected with a W58 filter and a ST630 filter. The specular blue image was projected with a W2B filter and a 2C5-60 filter.

| Color Exposure | Exposure Times (sec.) | Diffuser | Scratch Suppression |
|---|---|---|---|
| Blue | .100 | None | |
| Green | .0053 | None | Poor |
| Red | .00042 | None | |
| | .10572 total | | |
| Blue | 12.5 | .080" 2447 Rohm and Haas Plexiglass | |
| Green | .66 | .080" 2447 Rohm and Haas Plexiglass | Very Good |
| Red | .052 | .080" 2447 Rohm and Haas Plexiglass | |
| | 13.212 total | | |
| Blue | .100 | None | |
| Green | .66 | .080" 2447 Rohm and Haas Plexiglass | Very Good |
| Red | .052 | .080" 2447 Rohm and Haas Plexiglass | |
| | .812 total | | |

In other words, the combination specular-diffuse illumination device maintained the scratch suppression of the all-diffuse system while reducing the total of the three exposure times from 13.212 seconds to 0.812 seconds. Furthermore, it can be seen that the exposure time for blue illumination falls between the respective exposure times for green and red.

From the foregoing, the advantages of this invention are readily apparent. By utilizing the novel method of exposing a photosensitive material which is blue-speed limited to specular blue illumination separation image and to diffuse red and green illumination the total exposure time can be reduced while providing a high degree of defect or scratch suppression, thereby providing a total exposure time which is compatible with normal requirements. Of course, it will be understood that the same technique can be used with photosensitive materials which are speed limited in other colors, but the degree of scratch suppression will be less since the eye is more sensitive to defects in the cyan and magenta images.

The invention has been described in detail with reference to a preferred embodiment thereof, but it will be understood that variations and modifications can be effected within the spirit and scope of the invention.

I claim:

1. A method of shortening the overall projection time while still suppressing defects in a composite print made by projecting first, second and third color separation images onto a photosensitive material which is less responsive to exposure of said first color separation image than to said second and third color separation images, said method comprising in any order, the steps of:

projecting said first color separation image by means of substantially specular illumination onto said photosensitive material to shorten the exposure time of said photosenstive material to said first color separation image; and projecting said second and third color separation images by means of substantially diffuse illumination onto said photosensitive material to suppress defects in said composite print.

2. In a method of exposing a photosensitive material to an original that may contain defects by first, second and third color illumination, said photosensitive material being less responsive to illumination by said first color than to illumination by said second and third color, the improvement comprising in any order the steps of:

exposing said photosensitive material to said original by means of substantially specular illumination of said first color to reduce required exposure time; and exposing said photosensitive material to said original by means of substantially diffuse illumination of said second and third colors to suppress any defect in said original.

3. The method of claim 2 wherein said first, second and third colors comprise blue, red and green colors, respectively, and said photosensitive material is blue speed-limited and less responsive to illumination by blue light than to red and green light.

4. In a projection device for projecting sequentially first, second and third color separation images of an original which may contain defects along a projection axis onto a photosensitive surface which is less photosensitive to said first color separation image than to said second and third color separation images, the improvement in apparatus for shortening the overall projection time while suppressing such defects comprising:

a source of specular light;

movable means for supporting first, second and third color separation filters;

movable diffuser means mounted in optical alignment with said second and third color separation filters only; and means for moving said filter support means and said diffuser means into the projection axis between said source of specular light and said original to bring sequentially said first color separation filter into the projection axis to project a substantially specular first color separation image of said original onto the photosensitive surface to decrease exposure time of said photosensitive surface to said first color separation image and said second and third color separation filters and said diffuser means mounted in optical alignment therewith into the projection axis to project.

5. The improvement in the projection device, as claimed in claim 4, wherein:

said filter supporting means includes a first rotatable disc having said first, second and third color separation filters mounted therein in spaced positions therearound for sequential alignment with said projection axis upon rotation of said disc;

said diffuser means includes a second disc having first, second and third openings aligned with said first, second and third color separation filters, respectively, said first opening and said first color separation filter providing substantially specular light of said first color in said projection axis and said second and third openings each having a diffuser therein for providing with said second and third color separation filters, respectively, substantially diffuse light of said second and third colors, respectively, in said projection axis; and said moving means includes a shaft interconnecting said disc and said diffuser means for rotating them simultaneously.

6. The improvement in the projection device, as claimed in claim 4, wherein said first, second and third colors comprise blue, red and green colors, respectively; said photosensitive surface is blue speed-limited and less responsive to illumination by blue light than to red and green light; and said first, second and third color separation filters comprise blue, red and green separation filters, respectively.

* * * * *

UNITED STATES PATENT OFFICE
CERTIFICATE OF CORRECTION

PATENT NO. : 3,914,721
DATED : October 21, 1973
INVENTOR(S) : John S. Pollock

It is certified that error appears in the above-identified patent and that said Letters Patent are hereby corrected as shown below:

| Column and Line in Printed Patent | Amendment Filed in Response To Office Action of May 1, 1972 - Claim and Page and Line In Amendment | Mistake Noted |
|---|---|---|
| Col. 6, line 7 | Claim 10, Page 4 lines 1, 2 and 3 | Insert after project --- sequentially diffuse second and third color separation images of said original onto the photo-sensitive surface to suppress any defects in said original. |

Signed and Sealed this twentieth Day of April 1976

[SEAL]

Attest:

RUTH C. MASON
*Attesting Officer*

C. MARSHALL DANN
*Commissioner of Patents and Trademarks*